Nov. 3, 1964 J. D. OWEN 3,155,777

BALANCED STATIC SWITCHING CIRCUITS

Filed June 29, 1961 2 Sheets-Sheet 1

INVENTOR:
JACK D. OWEN,
BY J. David Blumenfeld
HIS ATTORNEY.

INVENTOR:
JACK D. OWEN,
BY
HIS ATTORNEY.

United States Patent Office 3,155,777
Patented Nov. 3, 1964

3,155,777

BALANCED STATIC SWITCHING CIRCUITS

Jack D. Owen, Lynchburg, Va., assignor to General Electric Company, a corporation of New York Filed June 29, 1961, Ser. No. 120,592
6 Claims. (Cl. 179—84)

This invention relates to a static switching circuit and more particularly, to a balanced A.C. static switch adaptable for use in carrier communication applications.

In a concurrently filed application, entitled "A.C. Static Switching Circuits," S.N. 120,760, filed on June 29, 1961 in the name of Jack D. Owen and assigned to the assignee of the present invention, a static switching arrangement is described which is particularly useful in connection with carrier signaling applications, such as telephony or multiplex carrier communication. The static switch described therein is utilized in a so-called "Ringdown" circuit for signaling individual stations on a common transmission medium by means of a coded ringing signal, and is actuated in response to a code signal from the calling station.

The static switch described in the above identified application is connected between the ringing generator and one side of a two wire line representing the common transmission medium, and includes oppositely poled unidirectional conducting devices, and suitable capacitor elements, at least one of which is connected to one side of the line. The first few cycles of the voltage from the ringing generator charges the capacitors to a polarity such that the unidirectional conducting devices are biased into the nonconducting state to prevent passage of the ringing signal to the line. The biasing for the unidirectional devices is selectively removed and the ringing voltage is applied to the line and the stations by externally actuating a supplemental current conducting path to discharge or by-pass the biasing capacitors. In this fashion, the static switch may be opened and closed in response to a code signal transmitted by the calling station to impress the ringing signal on the two wire line.

While this single-ended or unbalanced static switch and "Ringdown" circuit arrangement is satisfactory for many purposes, under some circumstances a balanced switch arrangement for use with a "Ringdown" circuit may be preferable. With a balanced arrangement, the ring current is applied symmetrically to both wires of the transmission line thereby minimizing or eliminating cross-talk or other forms of interference which may, under certain conditions, result from use of an unbalanced arrangement.

It is, therefore, an object of this invention to provide a balanced static switching circuit.

Another object of this invention is to provide a balanced static "Ringdown" circuit.

Yet another object of this invention is to provide a balanced "Ringdown" circuit which minimizes cross-talk and other forms of interference.

Other objects and advantages of the invention will become apparent as the description thereof proceeds.

Generally speaking, and in accordance with one aspect of the invention, an externally controlled switching arrangement is provided to facilitate selective application of an A.C. signal, such as that supplied by a ringing generator, to a load such as the telephone in an individual station. The switching arrangement comprises a pair of oppositely poled unidirectional conducting devices such as silicon controlled rectifiers, each of which is connected in shunt with one of a further pair of ordinary unidirectional conducting diode elements. The unidirectional devices and their associated diodes are so poled that the applied voltage from the A.C. source, in conjunction with a suitable gating signal, causes each of the unidirectional devices to be rendered conducting during that period of time when its associated diode is nonconducting. The conducting path for applying the A.C. ringing signal to the load is thereby established through one controlled rectifier, provided the proper gating signal is applied, and the diode associated with the other rectifier. Included in the circuit are elements which detect an incoming code signal, provide the necessary gating signal therefrom, and provide inter-locking of the incoming and outgoing signals to prevent circuit oscillations over the common transmission path. The balanced switch arrangement is connected to the two wires of the common transmission path so that the ringing current passed by the switching circuit is applied in a balanced fashion and thereby eliminates any cross-talk or other interference.

The features of this invention which are believed to be novel are set forth wtih particularity in the appended claims. The invention itself, however, together with further objects and advantages thereof, will best be understood by reference to the following description, taken in conjunction with the accompanying drawings, in which:

Figure 1:
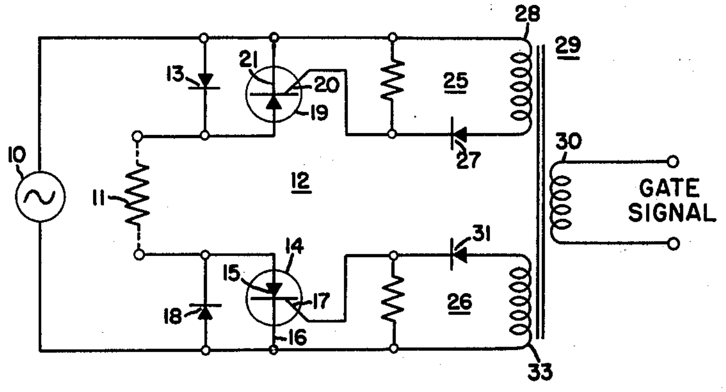
FIG. 1 is a schematic circuit diagram of the balanced switch arrangement of the invention.

FIG. 1 illustrates one form of a balanced static switch constructed in accordance with the principles of this invention and includes an alternating current supply source 10 which is applied to a load 11 through a static switch shown generally at 12. During positive alternations or half-cycles of the supply voltage from source 10, a conducting path to load 11 is completed through the combination of a diode 13 poled in the forward direction of current flow and a controlled unidirectional conducting device such as the silicon controlled rectifier (SCR) 14. Rectifier 14 includes an anode 15, a cathode 16 and a gate electrode 17, so connected that during positive half-cycles of the supply voltage, cathode 16 and anode 14 are forward biased. The supply voltage is not sufficient, however, to switch SCR 14 to the conducting state in the absence of a positive gating signal applied between gate electrode 17 and cathode 16. Thus, during positive half-cycles of the supply voltage and in the presence of a suitable gating signal, a conducting path is established from source 10 to load 11 through diode 13 and the gated silicon controlled rectifier 14.

During negative alternations or half-cycles of the supply voltage, an alternative conducting path is provided through diode 18 poled in the reverse direction and a second controlled unidirectional conducting device such as the silicon controlled rectifier 19. Controlled rectifier 19 is in the conducting state during negative half-cycles of the supply voltage if a gating signal is applied between gate electrode 20 and cathode 21. An alternating signal from source 10 is, therefore, applied to load 11 during both positive and negative half-cycles of the supply voltage from generator 10 provided that the silicon controlled rectifiers 14 and 19 are suitably gated.

SCR's 14 and 19 may be controlled in response to an external control or gate signal applied to gate circuits 25 and 26. Gate circuit 25 includes a diode 27 connected to gate electrode 20 and to winding 28 of gate transformer 29. Diode 27 is so poled that application of a gate signal to the primary winding 30 of transformer 29 produces positive, unidirectional gating pulses at the output of diode 27. Gating circuit 26, similarly, includes a diode 31 connected to gate electrode 17 and to an additional secondary winding 33 of transformer 29. Diodes 27 and 31 and the secondary windings 28 and 33 of transformer 29 are so arranged that upon application of a sinusoidal gating signal to the primary winding 30, one controlled rectifier is gated on during alternations of one polarity of the gate signal and the other controlled rectifier is gated on during alternations of the other polarity.

Silicon controlled rectifiers 14 and 19 are PNPN semiconductors, consisting of three rectifying junctions having cathode, anode and gate electrodes. With reverse voltage impressed across the cathode and anode (i.e., cathode positive with respect to the anode), the controlled rectifier blocks the flow of current. With a forward voltage applied to the rectifier (i.e., the anode is positive with respect to the cathode), the controlled rectifier also blocks the current flow up to a "breakover" point which is generally referred to as the $V_{BO}$. At this "breakover" point, the blocking resistance of a controlled rectifier decreases almost instantaneously to a very low value and current flow is limited only by the external voltage and circuit impedance. At anode-to-cathode voltages of less than $V_{BO}$, the controlled rectifier can be switched into the high conduction state by the application of a low level gate-to-cathode current. The anode-cathode voltage for controlled rectifiers 14 and 19, supplied from generator 10, is less than $V_{BO}$ so that the rectifiers do not conduct in the absence of a gating signal and the switch is "closed." The controlled rectifiers can be "turned off," and returned to the nonconducting state by reducing the flow of anode current to a value less than a "holding" value generally defined as $I_H$. The latter can be achieved by reducing the supply voltage to zero, as is the case with an alternating supply voltage coupled across the anode and cathode, or by diverting anode current around the controlled rectifier for a few microseconds. It will be appreciated that for the gate circuit of FIG. 1, termination of the gate signals causes rectifiers 14 and 19 to become nonconducting as soon as the alternating supply voltage supplied by generator 10 goes negative.

Figure 2:
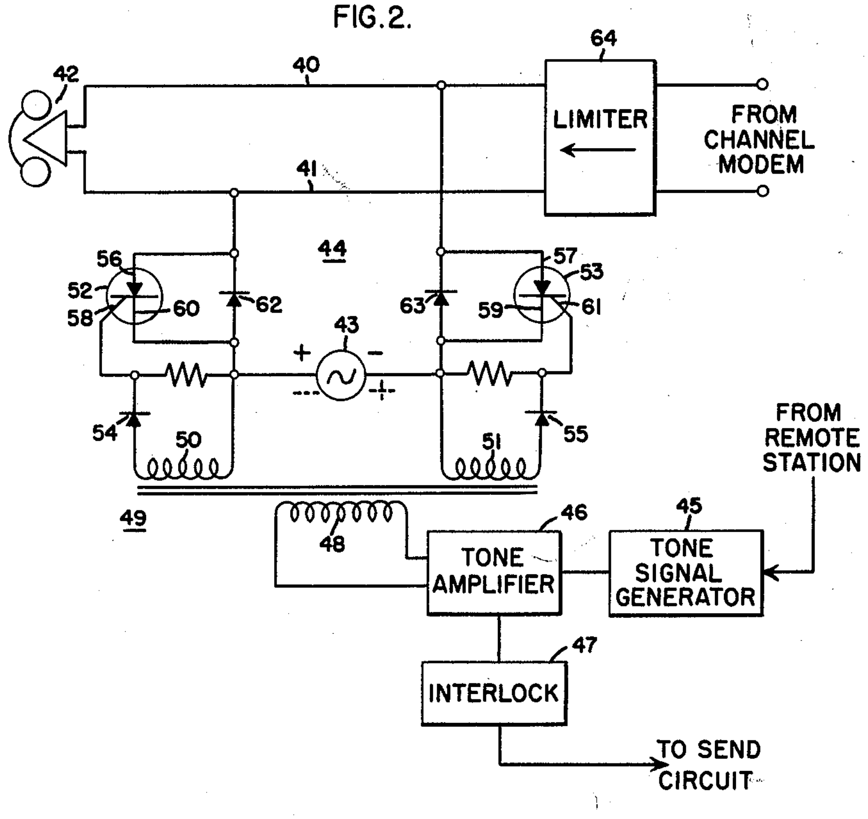
FIG. 2 illustrates, partially in block diagram form, a "Ringdown" circuit incorporating the static switch of FIG. 1.

FIG. 2 illustrates, partially in block diagram form, a static "Ringdown" circuit utilizing the static switch of FIG. 1. The common transmission medium, shown as a two wire line 40 and 41, is utilized for voice or other intelligence transmission between an individual station illustrated generally at 42 and a calling station located at a distant location. The station illustrated schematically at 42 includes a "ringer" which is actuated by the ringing signal applied to lines 40 and 41 from a balanced "Ringdown" circuit illustrated generally at 44. "Ringdown" circuit 44 is actuated in response to a coded calling signal from a remote calling station (a code which may take the form of any combination of spaced "long" and "short" pulses) to "open' a static switching arrangement and pass the ringing signal from ringing generator 43 to the line.

In the absence of a coded calling signal the static switch is closed, preventing passage of the ringing signal to the transmission line. Whenever a calling signal is received the switch is "open" during the interval of the coded calling pulses, facilitating passage of the ringing signal to the line. Coded calling signals, from a remote station, gate a tone signal generator 45 to produce sinusoidal output during the pulse interval. The frequency of the sinusoidal tone signal from generator 45 is substantially greater than the frequency of the signal from ringing generator 43, for reasons which will be presently described. The pulsed tone signal is applied to a tone amplifier 46 and an interlock circuit 47. Amplifier 46 is conventional in nature and amplifies the pulsed tone signal. Interlock circuit 47, which is also conventional in nature, isolates the incoming code signals from outgoing tone signals and thus prevents circuit ringing between the local station and the remote station.

The output from amplifier 46 is applied to primary winding 48 of a gate transformer 49. Transformer 49 includes two secondary windings 50 and 51 which form part of a gating circuit for controlled rectifiers 52 and 53 of the balanced static switch. Diodes 54 and 55 are connected to windings 50 and 51 respectively and are so poled that during alternations of one polarity of the tone signal, diode 54 conducts and produces positive output pulses, and during alternations of the other polarity, diode 55 conducts and produces positive output pulses. The positive output pulses from diodes 54 and 55 are respectively coupled to gate electrodes 58 and 61 of controlled rectifiers 52 and 53, which also include anodes 56 and 57, cathodes 59 and 60. Application of gate pulses to the controlled rectifiers "opens" the static switch to apply a ringing signal from ringing generator 43 to line 40-41 and to the "ringer" of subscribers set 42. Controlled rectifiers 52 and 53 are respectively connected in shunt with diodes 62 and 63 and in series with ringing generator 43.

During positive half-cycles of the signal from ringing generator 43, its terminals have a polarity indicated by the solid plus (+) and minus (—) signs and a conducting path is completed through diode 62 poled in the forward direction of current flow and controlled rectifier 53. That is, during positive half-cycles, cathode 60 of controlled rectifier 52 is positive relative to its anode and hence the rectifier is reverse biased and does not conduct even if a gating voltage is applied to gate electrode 58. Controlled rectifier 53, on the other hand, is forward biased as cathode 59 is negative with respect to anode 57 and conducts upon the application of a positive gating voltage to gate electrode 61. During the negative half-cycles of the signal from ringing generator 43, the generator terminals have a polarity illustrated by means of the dashed plus (+) or minus (—) signs, diode 62 is reverse biased and in the nonconducting state whereas diode 63 is forward biased and in its conducting state. Controlled rectifier 53 is now reverse biased (as cathode 59 is now positive relative to anode 57) and controlled rectifier 52 is forward biased (as cathode 60 is now negative relative to anode 56). Controlled rectifier 52, therefore, conducts upon the application of a positive gating pulse to gate electrode 58, establishing a conducting path from ringing generator 43 through diode 63 and controlled rectifier 52. As long as the coded tone signal from tone signal generator 45 and tone amplifier 46 is present to provide positive gating pulses, the static switch forming part of "Ringdown" circuit 44 is "open" to apply the ringing current to lines 40 and 41 and thence to the individual station shown schematically at 42.

The code signal interval, and hence the time the switch is "open," is customarily much longer than the period of one cycle of the ringing signal. It is, therefore, necessary to regate the controlled rectifiers 52 and 53 at the beginning of each half-cycle of the ringing signal from generator 43. It is for this reason, that the frequency $f_t$ of the tone signal from generator 45 must be substantially greater than the frequency $f_r$ of the signal from ringing generator 43. Otherwise the system becomes phase sensitive and ringing delays are the result. For example, if the tone and ringing signal frequencies were about the same and the two signals were out of phase a maximum delay equal to the period of one half-cycle of the ringing signal could occur. If the tone signal frequency is much larger than the ringing signal frequency, however, the delay will be such a small fraction of the ringing signal period that it is, for all practical purposes, imperceptible. That is, even if there is no positive gating pulse present at the moment that the supply voltage is of a polarity to forward bias the controlled rectifier, the rectifier will be gated on very shortly afterwards, since the period of the tone signal is very small compared to the ringing signal period; i.e., $$\frac{1}{f_r} \gg \frac{1}{f_t}$$

Figures 3, 4, 5, 6, 7, 8, 9, 10, 11, 12:
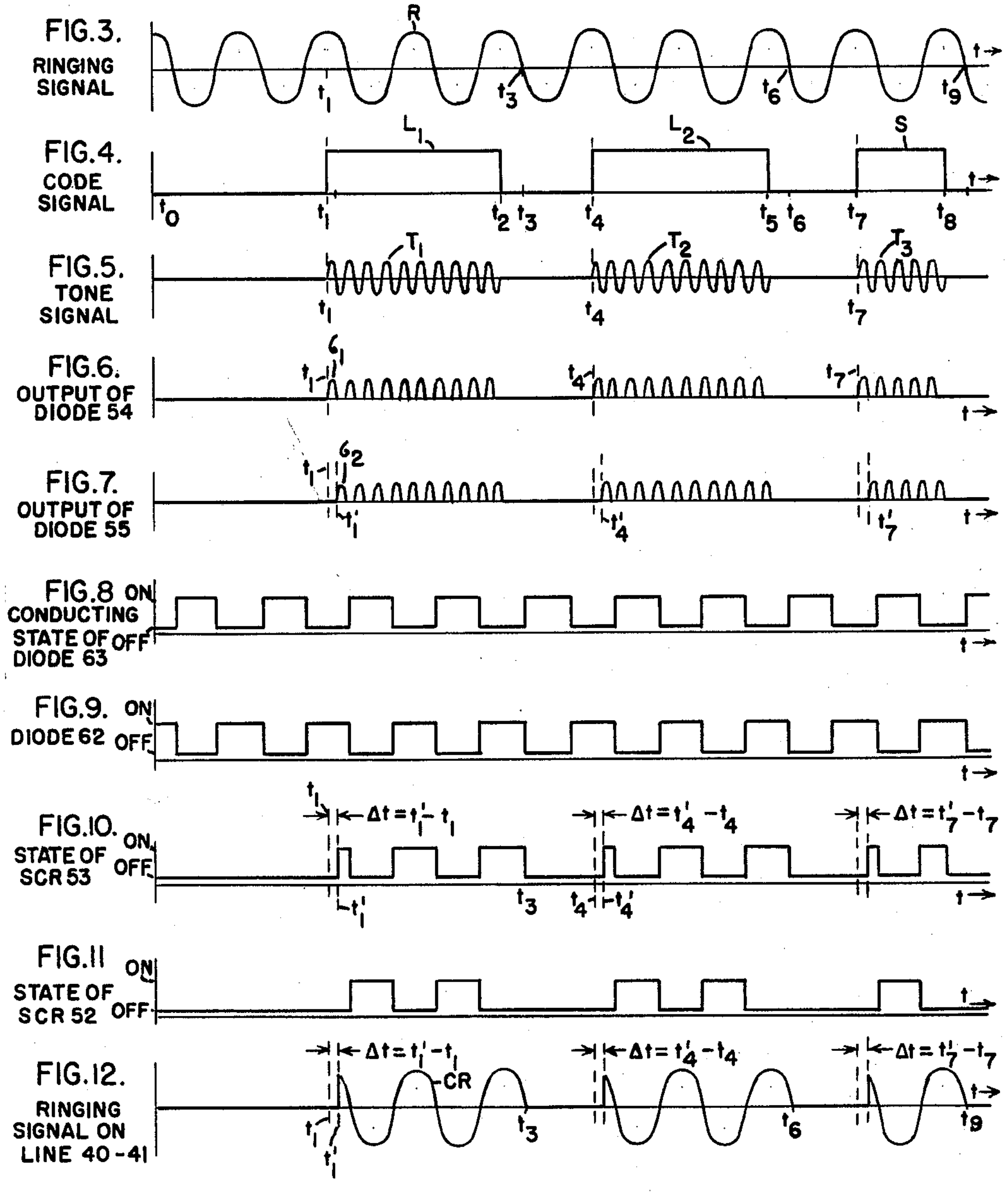
FIGS. 3–12 are wave form diagrams useful in understanding the operation of the "Ringdown" circuit.

The operation of the "Ringdown" circuit illustrated in FIG. 2 as well as the manner in which the rectifiers are regated may best be understood by reference to FIGS. 3–12, which are wave form diagrams illustrating the wave forms in various portions of the circuit arrangement of FIG. 2. FIG. 3 illustrates the wave form of the output from ringing generator 43 which is illustrated as a time varying sinusoid R. FIG. 4 illustrates the coded calling signals from the remote station plotted against time along the abscissa. Thus from $t_0$–$t_1$ no coded signal is received from the remote station. At time $t_1$ a coded signal $L_1$ taking the form of a "long" pulse, having a time interval $t_1$–$t_2$, is received, followed by another "long" pulse $L_2$ and then a "short" pulse $S_1$. During these intervals tone signal generator 45 is gated "on" and produces a pulsed sinusoidal tone signal output which is illustrated in FIG. 5 by the curves $T_1$, $T_2$ and $T_3$.

The tone signal frequency is higher than the ringing signal frequency as can be seen by comparing FIG. 5 and FIG. 3. For the sake of simplicity of illustration, the tone signal frequency is shown to be three times the ringing signal frequency. In actuality, however, the frequency of the tone signal will be much larger than that of the ringing signal and typically, the ringing signal frequency may be 20 cycles per second whereas the tone signal frequency $f_t$ may be several thousand cycles, with a typical frequency being 3825∼. However, the basic principles are substantially the same. Tone signals $T_1$, $T_2$ and $T_3$ are coupled through transformer 49 to diodes 54 and 55. As pointed out previously, diodes 54 and 55 and secondary windings 50 and 51 are so arranged that during the positive half-cycles of the tone signal, diode 54 conducts and during the negative half-cycles, diode 55 conducts. As illustrated in FIGS. 6 and 7, two out-of-phase positive pulse trains $G_1$ and $G_2$ are produced at the output of diodes 54 and 55. These positive pulses are applied respectively to the gate electrodes 58 and 61 of controlled rectifiers 52 and 53.

During the time intervals $t_0$–$t_1$ when no code signal is present at the input of tone signal generator 45, diodes 62 and 63, which are shunted by controlled rectifiers 52 and 53, alternately conduct during the positive and negative half-cycles of the ringing signal generator 43, a condition illustrated in FIGS. 8 and 9 of the drawings. However, during this interval, both controlled rectifiers 52 and 53 are in a nonconducting state, as shown in FIGS. 10 and 11, since the amplitude of the ringing signal is less than the "breakover" voltage $V_{BO}$ and there are no gating pulses applied. Although diode 62 is forward biased during positive half cycles, neither diode 63 nor controlled rectifier 53 are in the conducting state and the ringing signal from generator 43 cannot pass to line 40—41 and station 42. During the negative alternation, diode 63 is forward biased but neither diode 62 nor controlled rectifier 52 is in a conducting state.

At time $t_1$, however, code signal $L_1$ is received and tone generator 45 is gated on to produce pulsed tone signal $T_1$. At time $t_1$, ringing signal R is going through its positive alternation and diode 62 is in its conducting state and controlled rectifier 53 is forward biased. Rectifier 53, however, does not conduct until a positive gating pulse appears at the output of diode 55 and is applied to gate electrode 61. As can be seen from FIG. 7, at time $t_1$ diode 55 is not conducting so that controlled rectifier 53 is not gated on immediately. A short interval later, i.e., at time $t_1'$, where $$|t_1'-t_1| < \frac{1}{f_t} \ll \frac{1}{f_r}$$

a gating pulse is applied to gate electrode 61 and controlled rectifier 53 is brought to its conducting state. This turns the static switch "on" establishing a conducting path to station 42 from ringing generator 43 through diode 62 and rectifier 53. Controlled rectifier 53 remains in its conducting condition until the ringing signal goes to zero at which time the anode and cathode of controlled rectifier 53 is reverse biased terminating conduction.

With reversal of ringing signal polarity, diode 63 becomes conducting and the anode-cathode of controlled rectifier 52 is forward biased. The appearance of the first positive gating pulse at the output of diode 54 gates controlled rectifier 52, establishing a conducting path to the two wire line through diode 63 and rectifier 52, a condition illustrated in FIG. 11 of the accompanying drawings. During the code pulse interval $|t_2-t_1|$ this process is repeated for each half-cycle of the ringing signal with the two rectifiers being regated by the positive gating pulses from diodes 54 and 55.

At time $t_2$ coded pulse $L_1$ disappears, disabling tone generator 45 and terminating the tone signal $T_1$. However, the controlled rectifier which is in the conducting state at this particular instant, in this case, controlled rectifier 53, does not stop conducting unless the ringing signal is going through zero at that particular instant. Silicon controlled rectifiers are similar to gas-filled thyratron devices in this respect in that the control or gate electrodes lose control once conduction is initiated. That is, once the silicon controlled rectifier goes into its conducting state, conduction is not terminated until the supply voltage across the anode and cathode is reduced to zero. Therefore silicon controlled rectifier 53 continues to conduct until time $t_3$ at which time the ringing signal R goes to zero. Thus, after removal of the tone signal T, a maximum of one-half cycle of ringing current will flow before both silicon controlled rectifiers are blocking. It is obvious therefore that the intervals $|t_4-t_2|$ and $|t_7-t_5|$ between the code pulses $L_1$, $L_2$ and S must be greater than the period of one-half the cycle of the ringing suply voltage in order to distinguish between the code pulses, i.e., $$\left|\begin{matrix} t_4-t_2 \\ t_7-t_5 \end{matrix}\right| > \frac{1}{2f_r}$$

Upon the appearance of the second code pulse $L_2$ the entire procedure is repeated.

It will be apparent that the continuous sinusoidal ringing signal R produced by ringing generator 43 is applied to line 40—41 and station 42 in the form of the pulsed ringing signal shown in FIG. 12 with the duration and pattern corresponding to the received calling signals $L_1$, $L_2$ and S. The electromechanical "ringer," or the like, at station 42, therefore, produces an audible indication in the predetermined code pattern to inform the station assigned the particular code combination that it is being called.

While a particular embodiment of this invention has been shown, it will, of course, be understood that it is not limited thereto since many modifications both in the circuit arrangement and in the instrumentalities employed may be made. It is contemplated by the appended claims to cover any such modifications as fall within the true spirit and scope of this invention.

What is claimed as new and desired to be secured by Letters Patent is:

1. In a static ringdown circuit for a telephone line including a ringing generator; an arrangement comprising first switching means connected to one side of a telephone line and said ringing generator, second switching means connected between the other side of said telephone line and said ringing generator, said first and second switching means including unidirectional conducting means and controlled semiconductor switching devices, means for generating gating signals for said controlled devices in response to and for the duration of code signals impressed thereon, means to apply said gating signals alternately to said switching devices whereby a conducting path from said ringing generator to one side of said telephone line is established through one of said unidirectional devices and one of said controlled switching devices during alternations of one polarity, and a conducting path is established through the remaining unidirectional and switching devices during alternations of the opposite polarity.

2. In a ringdown circuit for a telephone line including a ringing signal generator; an arrangement comprising a parallel connected diode and controlled rectifier coupled between one terminal of said ringing generator and one side of said telephone line, parallel connected diode and control rectifier coupled between the other terminal of said ringing generator and the remaining telephone line, means for generating gating signals for said controlled rectifiers in response to and for the duration of a code signal impressed thereon, and means for applying said gating signals alternately to said controlled rectifiers and thereby establish a conducting path through one diode and one controlled rectifier during ringing signal alternations of one polarity and a conducting path through the remaining diode and controlled rectifier during ringing signal alternations of the opposite polarity.

3. A ringdown circuit according to claim 2 wherein said means for generating a gating signal includes means for generating an alternating signal of a frequency which is high compared to the ringing generator frequency, and means to produce gating pulses for the respective controlled rectifier in response to the alternations of said last named alternating signal.

4. In a balanced static switching arrangement for selectively applying an alternating signal to a utilization device, the combination comprising a pair of input terminals adapted to receive an alternating signal, a pair of output terminals for connection to a utilization device, a first switching means connected between one of said input terminals and one of said output terminals, a second switching means connected between the other of said input and output terminals, said first and second switching means each including a unidirectional conducting device and a controlled semiconductor switching device, a source of gating signals for said controlled switching device, means for applying said gating signals alternately to said controlled devices whereby during alternations of one polarity a conducting path is established through the controlled device of one of said switching means and the unidirectional device of the other of said switching means and through the controlled device of said other switching means and the unidirectional conducting device of said one switching means during alternation of the opposite polarity.

5. In a balanced static switching arrangement for selectively applying an alternating signal to a utilization device, the combination comprising a pair of input terminals adapted to receive an alternating signal, a pair of output terminals for connection to a utilization device, a first switching means connected between one of said input terminals and one of said output terminals, a second switching means connected between the other of said input and output terminals, said first and second switching means each including an externally controlled semiconductor switching device and a unidirectional device connected in shunt, the unidirectional and controlled devices in each of said switching means being poled for opposite directions of current flow, a source of gating signals for said controlled switching devices, means for applying said gating signals alternately to said controlled devices whereby, during alternations of one polarity, a conducting path is established through the controlled device of one of said switching means and the unidirectional device of said other switching means and through the controlled device of the other switching means and the unidirectional device of said one switching means during alternations of the opposite polarity.

6. The balanced static switching arrangement, according to claim 5, wherein said controlled device is a controlled rectifier and said unidirectional conducting means is a diode.

References Cited in the file of this patent

UNITED STATES PATENTS

| | | |
|---|---|---|
| 2,827,519 | Morris | Mar. 18, 1958 |
| 2,920,240 | Machlem | Jan. 5, 1960 |
| 2,998,487 | Hilbourne | Aug. 29, 1961 |

OTHER REFERENCES

Solid State Products, Inc., "A Survey of Some Circuit Applications of the Silicon Controlled Switch and Silicon Controlled Rectifier," Bulletin D420-04(8-59).